United States Patent
Boeke

(10) Patent No.: US 6,643,146 B2
(45) Date of Patent: Nov. 4, 2003

(54) CONVERTER

(75) Inventor: Ulrich Boeke, Langerwehe (DE)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 10/084,737

(22) Filed: Feb. 25, 2002

(65) Prior Publication Data

US 2002/0126515 A1 Sep. 12, 2002

(30) Foreign Application Priority Data

Mar. 1, 2001 (DE) .......................................... 101 09 967

(51) Int. Cl.[7] ...................... H02M 3/335; H02M 7/5387
(52) U.S. Cl. ........................................... 363/17; 363/132
(58) Field of Search ............................. 363/34, 37, 39, 363/98, 132, 127, 17, 41, 16, 131

(56) References Cited

U.S. PATENT DOCUMENTS

| | | | | |
|---|---|---|---|---|
| 4,628,426 A | * | 12/1986 | Steigerwald ................. | 363/17 |
| 4,672,528 A | * | 6/1987 | Park et al. ..................... | 363/98 |
| 4,855,888 A | * | 8/1989 | Henze et al. .................. | 363/17 |
| 5,777,859 A | | 7/1998 | Raets ........................... | 363/24 |
| 5,886,884 A | * | 3/1999 | Back et al. ................... | 363/48 |
| 5,963,436 A | * | 10/1999 | Yoshida ....................... | 363/17 |
| 6,442,047 B1 | * | 8/2002 | Cohen .......................... | 363/17 |
| 6,466,456 B2 | * | 10/2002 | Sauerlaender et al. ........ | 363/16 |

* cited by examiner

*Primary Examiner*—Rajnikant B. Patel
(74) *Attorney, Agent, or Firm*—Dicran Halajian

(57) ABSTRACT

A converter converts a DC voltage $U_{Bat}$ into an output direct voltage $U_{out}$, in particular in TV or computer screens. The converter includes a full-bridge circuit for chopping the DC voltage $U_{Bat}$ into an AC voltage $U\sim$ on its output and a switching circuit for converting the AC voltage $U\sim$ into the output direct voltage $U_{out}$ of the converter. The converter further includes a control circuit for generating control signals to drive controllable switching elements in the full-bridge circuit. The output voltage $U_{out}$ remains stable even during a switching of the full-bridge circuit between two operating modes due to the control circuit only carrying out this switching during a dead time interval $t_{tot}$, during which at least one of the switching elements is switched off.

13 Claims, 7 Drawing Sheets

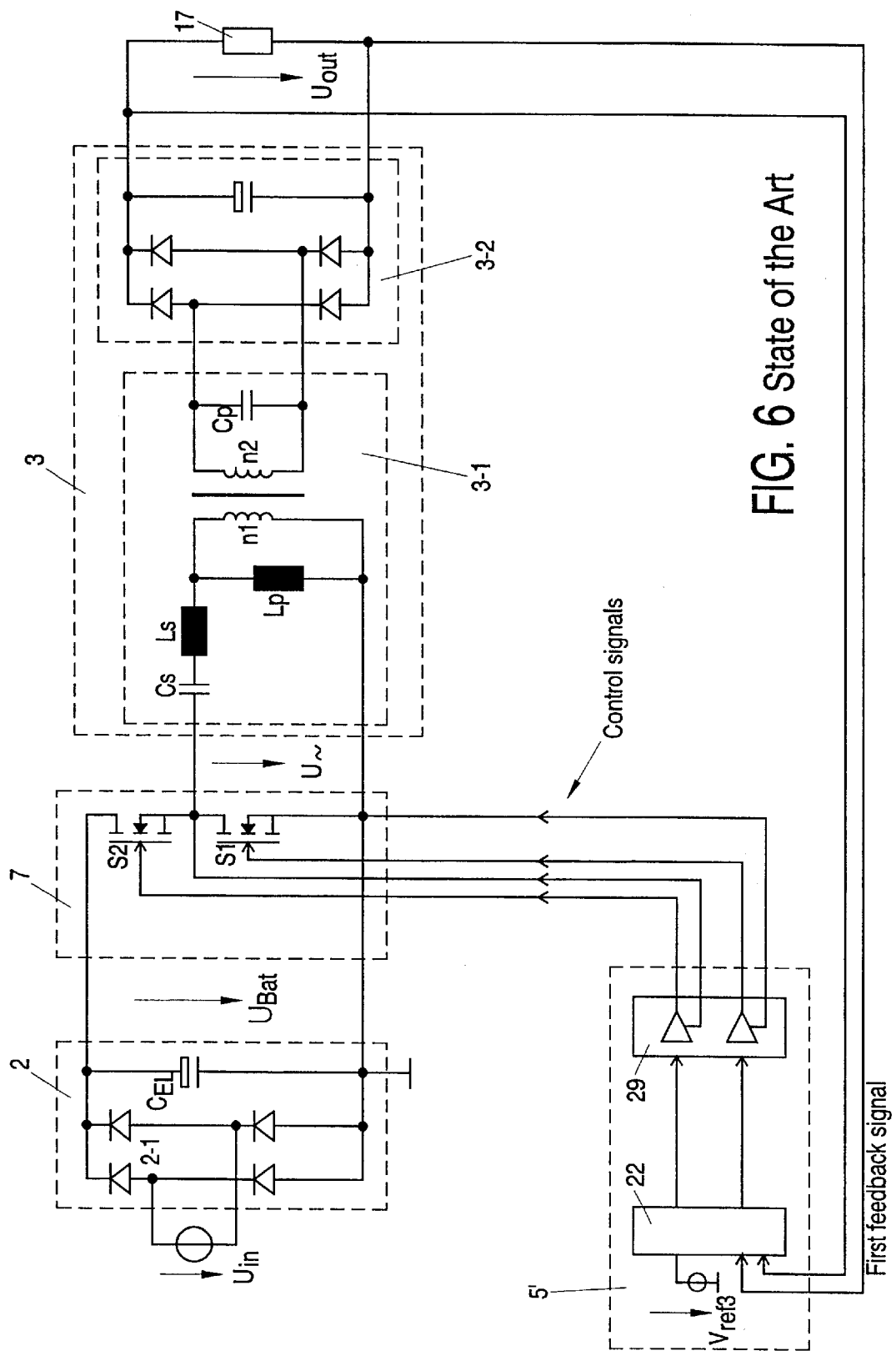

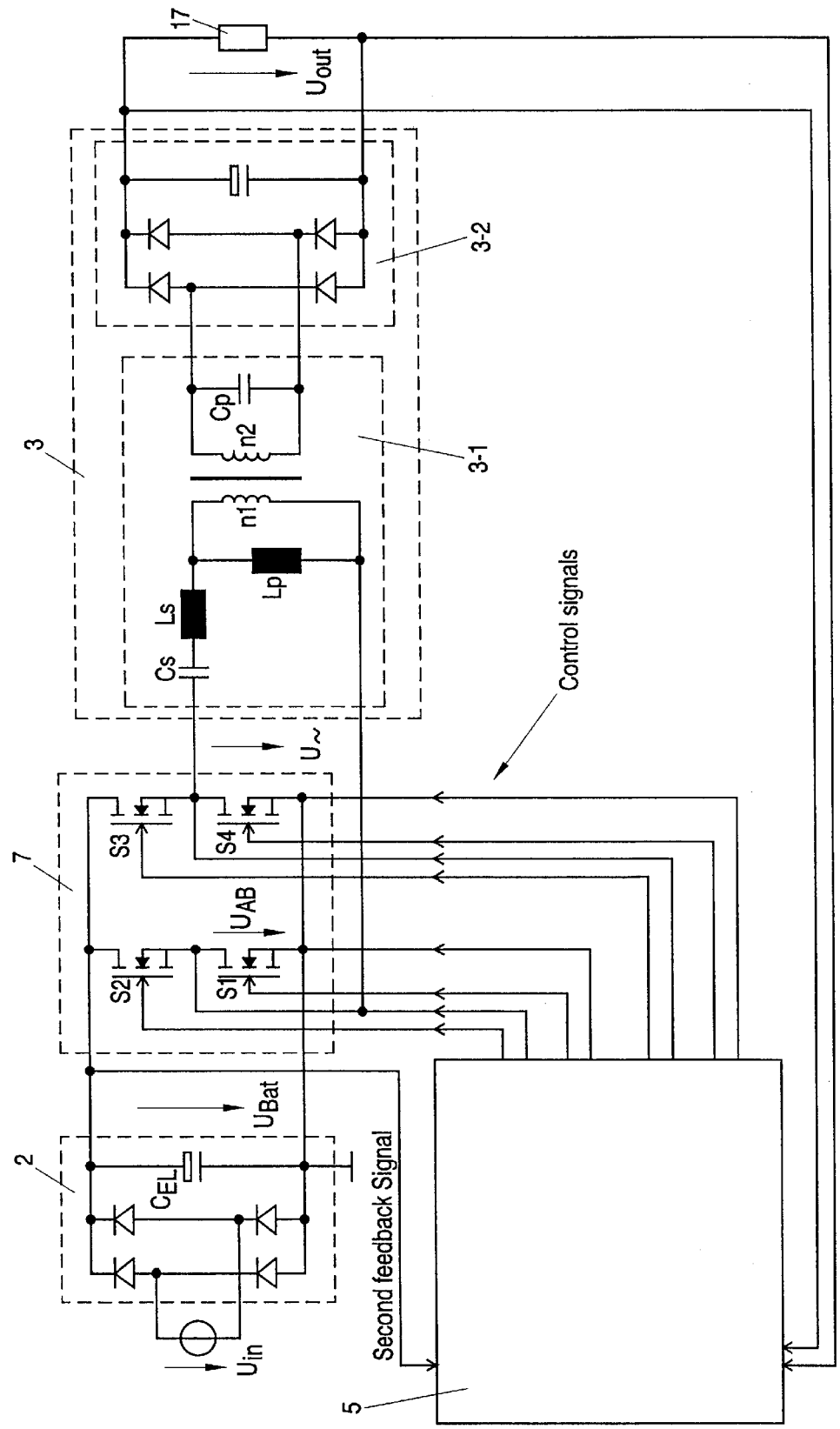
Fig. 7 State of the Art

CONVERTER

FIELD OF THE INVENTION

The invention relates to a converter for conversion of a DC voltage into an output direct voltage, in particular in TV or computer screens.

BACKGROUND OF THE INVENTION

Such a converter is, by way of example, known from U.S. Pat. No. 5,777,859 in connection with a data sheet for high intensity resonance control devices MC 33067 and MC 34067 from Motorola Inc. from the year 1996 and shown in FIG. 6.

The converter in accordance with FIG. 6 comprises a rectifier device 2 for converting the input voltage $U_{in}$ into a DC voltage $U_{Bat}$. The rectifier device 2 is made up of a full-wave diode bridge rectifier 2-1 and a smoothing capacitor $C_{EL}$ connected in series.

The converter further comprises a bridge circuit 7 with controllable switching elements S1, S2 for converting the DC voltage $U_{Bat}$ into an AC voltage U~, which is converted by a switching circuit 3 connected in series into an output direct voltage $U_{out}$ of the converter.

The switching circuit 3 comprises a resonance power converter 3-1 and a second rectifier 3-2 connected in series. The power converter 3-1 has in parallel with its input a series-parallel circuit, which comprises a capacitor Cs and two coils Ls, Lp. In parallel with the coil Lp the primary side of a transformer 13 is connected with the primary side number of windings n1. On the secondary side the transformer has n2 windings, with which a capacitor Cp is connected in parallel. A voltage across the capacitor Cp produces the output voltage of the power converter 3-1. The second rectifier 3-2, which has the same embodiment as the first rectifier 2, receives on its input the output voltage from the power converter 3-1 and generates on its output the output voltage of the converter $U_{out}$.

The output direct voltage $U_{out}$ is normally output to a load 17, which is connected to the converter. In order to drive the switching elements S1, S2 of the bridge circuit 7 the converter further comprises a control circuit 5', which generates the control signals in response to a first feedback signal representing the size of the output direct voltage $U_{out}$ of the converter.

The efficiency of the resonance power converter 3-1 drops considerably if it is operated with input voltages, that is AC voltages U~, that are distributed across a wide voltage range; in this case undesirable losses occur in the power converter 3-1 because of the reactive power circulating within it.

This disadvantage can be overcome by embodying the bridge circuit 7 as a full-wave circuit in accordance with FIG. 7. The full-wave circuit comprises two parallel branches, each of which has two controllable switching elements S1 . . . S4 connected in series. The DC voltage input voltage $U_{Bat}$ is supplied to the full-wave circuit 7 parallel to its branches, while it provides the AC voltage U~ between the two switching elements of the two parallel branches.

A control circuit 5 generates control signals to drive each of the controllable switching elements S1, S2 individually in accordance with a first converter operating mode referred to hereinafter as the "half-bridge mode" or in accordance with a second operating mode referred to hereinafter as "full-bridge mode". Switching between the two modes takes place by the control circuit 5 according to a second feedback signal that represents the size of the DC voltage $U_{Bat}$.

At low DC voltages of, for example, 100 to 200 V the bridge circuit 7 operates in the full-bridge mode with a phase margin of 180°. At higher DC voltages of, for example, 200 to 380 V the bridge circuit 7 on the other hand works in the half-bridge mode. Through corresponding switching between the operating modes it is possible to achieve a halving of the range of the AC voltage U~ input voltage of the resonance power converter 3-1 in a suitable manner in relation to the pure DC voltage $U_{Bat}$.

SUMMARY OF THE INVENTION

It is an object of the invention is to further develop a known converter such that the output voltage $U_{out}$ generated by it also remains stable during the switching of its operating mode between a full-bridge mode and a half-bridge mode.

This object is achieved in accordance with the invention by switching from full-bridge mode to half-bridge mode or vice-versa only during a dead time interval during which at least one of the switching elements of the full-bridge circuit is under no-load, that is switched off.

This has the advantage that undesired voltage fluctuations, as they occur during switching between switching elements under load, are avoided.

In accordance with an initial example of embodiment the converter has a first comparator circuit for the generation of a reference signal as a binary signal according to the result of a comparison of the DC voltage with an initial and a second reference voltage. Advantageously this first comparator circuit is embodied as a threshold detector, which defines a hysteresis loop on the basis of the first and second reference voltage, through which the reference signal generated is kept stable in relation to minor fluctuations in the DC voltage.

There is a further advantage if the control has at least one matching circuit to carry out the adaptation of the level of the control signals for the switching elements of the full-bridge circuit to the predefined level requirements.

Further advantageous embodiments of the converter are the object of the sub-claims.

BRIEF DESCRIPTION OF THE DRAWINGS

The following Figures appended to the specification show as follows:

FIG. 6 a converter in accordance with the state of the art, and

FIG. 7 a known further development of the converter in accordance with FIG. 6.

In the following two examples of embodiment of the present invention are described in more detail with reference to FIGS. 1 to 5.

DETAILED DESCRIPTION OF THE INVENTION

Figure 1:
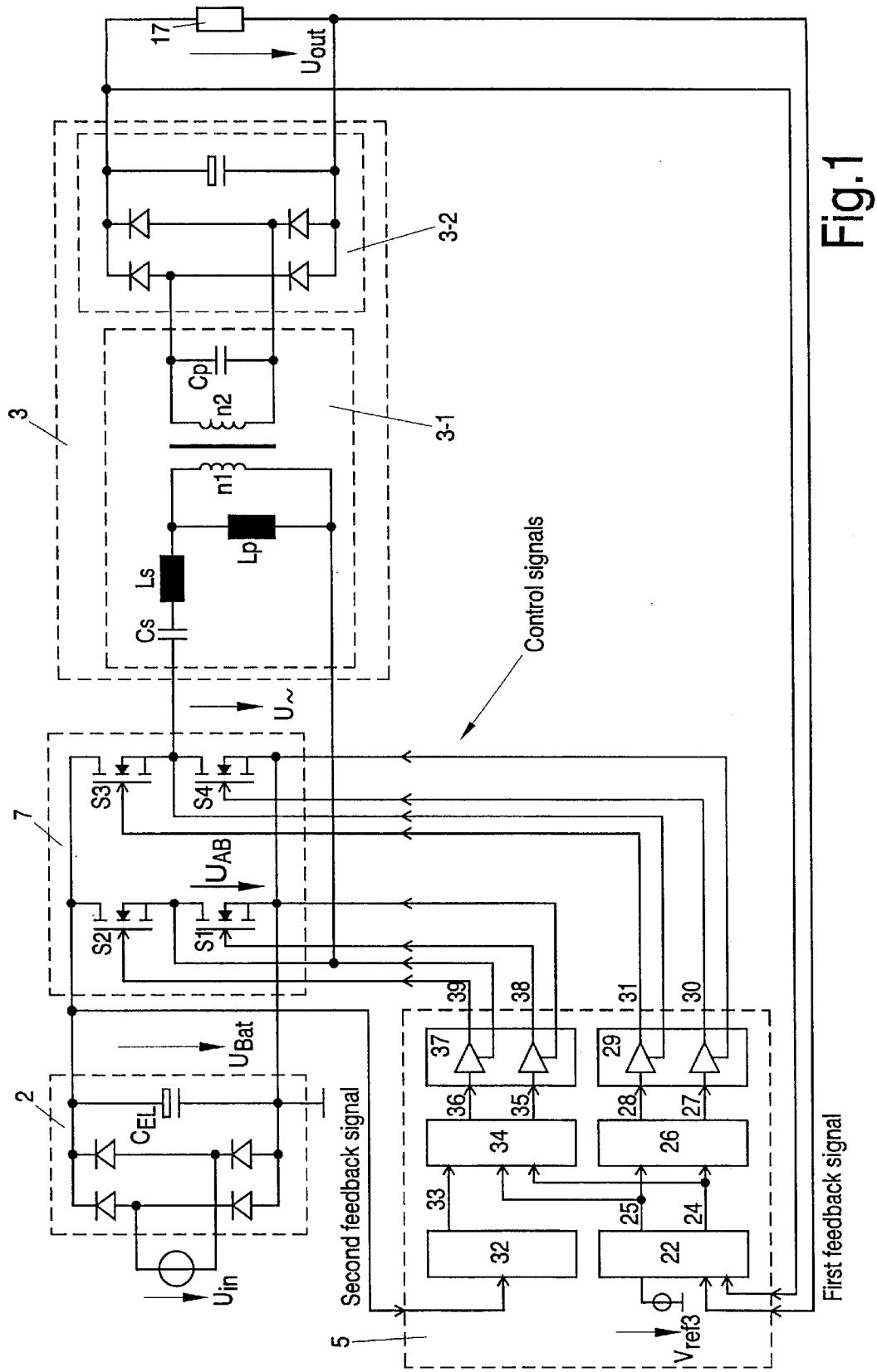
FIG. 1 a converter in accordance with the present invention.

FIG. 1 essentially shows the converter already described above with reference to FIG. 7. The references in the two figures designate the same components of both converters.

Figure 2:
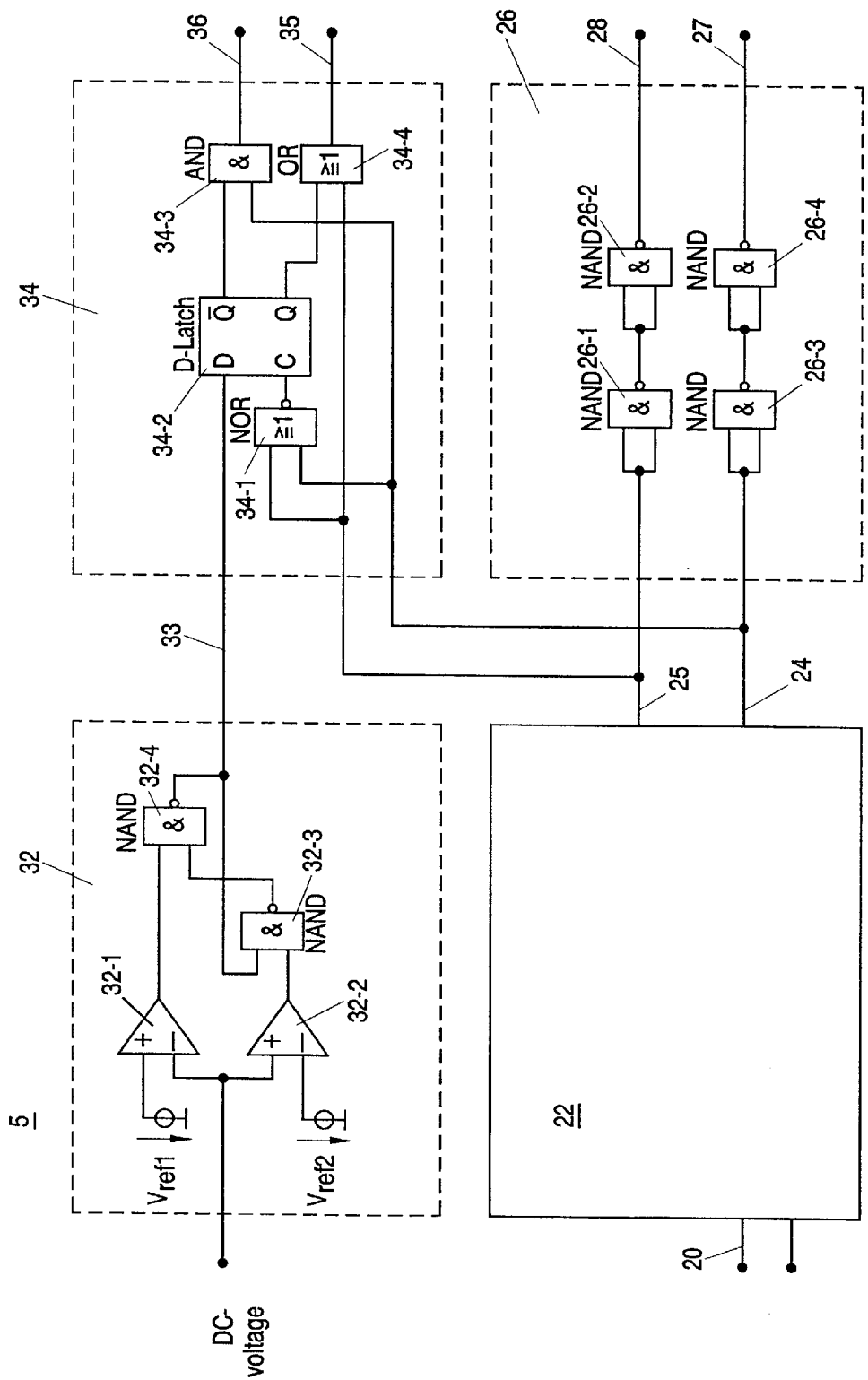
FIG. 2 a control circuit of the converter in accordance with FIG. 1.

The converter in accordance with the present invention and the known converter in accordance with FIG. 7 differ, however, by the embodiment of the control circuit in accordance with FIG. 2.

The control circuit 5 in accordance with the present invention, as shown in FIG. 1, comprises a first comparator circuit 32 for generating a binary reference signal and a second comparator circuit 22 for generating a fourth control signal 24 for driving the switching element S4 and for generating a third control signal 25 for driving the third switching element S3.

All the switching elements are preferably embodied as power semiconductor devices.

In accordance with FIG. 1 the control circuit 5 further comprises a logic circuit 34 for generating a delayed first control signal 35 for driving the first switching element S1 of the full-bridge circuit 7 and for generating a delayed second control signal 36 for driving the second switching element S2. The generation of the first and second control signals 35, 36 takes place by processing the third and fourth control signals, as they are output from the second comparator circuit 22 in response to the binary reference signal 33. The control circuit 5 further comprises a time-delay circuit 26 for delaying the third and fourth control signals for at least approximately a time that corresponds to the time for a signal to be processed by the logic circuit 34, so that the respective control signals on the outputs of the logic circuit 34 and the time-delay circuit 26 are synchronized with each other. Finally, the control circuit 5 comprises a further two matching circuits 29 and 37 for carrying out the adaptation of the level of the time-delayed first, second, third and/or fourth control signals to the level required specified by the associated switching elements S1 . . . S4.

The sub-circuits 22, 26, 32, 34 of the control circuit 5 listed above are described in more detail in the following using FIG. 2.

In the comparator circuit 32 the DC voltage of the converter is fed to the inverting input of a first operational amplifier 32-1 and the non-inverting input of a second operational amplifier 32-2. The first operational amplifier 32-1 compares the DC voltage with first specified reference voltage $V_{ref1}$, that is present on its non-inverting input, while the second operational amplifier 32-2 compares the DC voltage with a second specified reference voltage $V_{ref2}$, that is present on the inverting input of this. The output of the second operational amplifier 32-2 is applied to an input of a NAND element 32-3, to the second input of which the output of the first comparator 32 is fed back. The output of this first NAND element 32-3 along with the output of the first operational amplifier 32-1 form the inputs for a second NAND element 32-4, the output of which at the same time forms the output of the first comparator circuit 32.

The circuit arrangement described for the first comparator circuit 32 forms a threshold detector that via the two internal reference voltages $V_{ref1}$, $V_{ref2}$ defines a hysteresis loop. The status and changes in the DC input voltage $U_{Bat}$ are compared with the defined hysteresis loop. In this way on the output of the first comparator circuit 32 the binary reference signal 33 is present, on the basis of which a switching between the operating modes of the full-bridge circuit 7 takes place.

With the circuit arrangement in accordance with FIG. 2, but not necessarily, the full-bridge circuit 7 is switched to the full-bridge mode, if the reference signal 33 has taken the binary value zero; otherwise the full-bridge circuit 7 is switched to the half-bridge mode, if the binary reference signal has taken the binary value of 1.

Figure 4A:
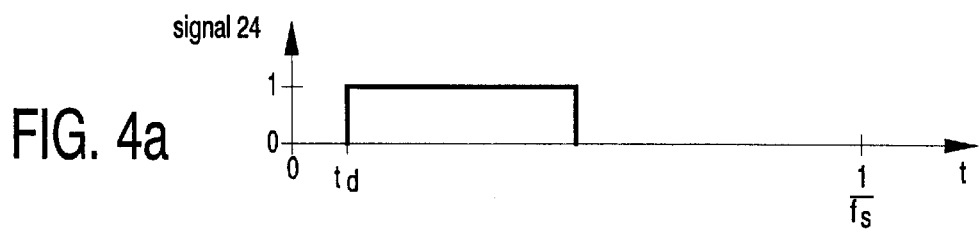
FIG. 4 signal characteristics within the control circuit in accordance with FIG. 2 in a half-bridge mode.
Figure 4B:
Figure 4C:
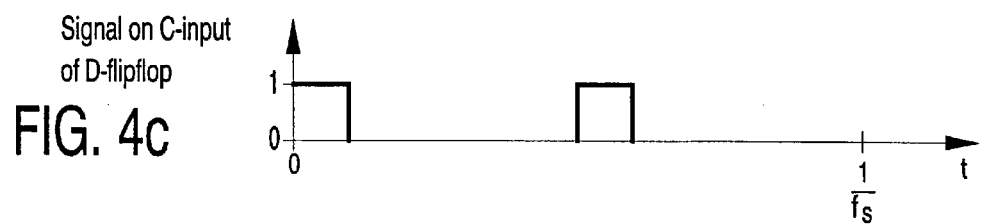

The second comparator circuit 22 generates the third and fourth control signals in accordance with FIGS. 4a and 4b according to the result of a comparison of the output direct voltage $U_{out}$ of the converter with a specified third reference voltage $V_{ref3}$.

The binary reference signal 33 and the third 25 and fourth 24 control signals form the inputs signals to the logic circuit 34 shown in FIG. 2. The third and fourth control signals are fed to the inputs of a NOR element 34-1, the output of which is connected to the clock input C of a D-flip-flop 34-2. The D-input of this flip-flop 34-2 is operated by the binary reference signal 33. The logic circuit 34 further comprises an AND element 34-3, the first input of which is operated by the inverted output signal of the flip-flop 34-2 and the second input by the fourth control signal 24. At the output of this AND element 34-3 the time-delayed second control signal 36 is output. The logic circuit 34 further comprises an OR element 34-4, the first input of which is connected with the non-inverting output Q of the flip-flop 34-2, and which on its second input receives the third control signal 25. At the output of this OR element 34-4 the time-delayed first control signal is output.

The generation of the first and second control signals by the logic circuit 34 requires a certain additional time compared with the generation of the third and fourth control signals on the output of the second comparator circuit 22. To compensate for this time difference the control circuit 5 further comprises the time-delay circuit 26, that delays the third and fourth control signals such that these two signals have the correct time relationship with the first and second control signals. For this purpose the time-delay circuit 26 delays the third and fourth control signals each by the time needed by the logic circuit 34 to generate the first and second control signals from the third and fourth control signals. In order to achieve this delay both the third and the fourth control signals 25, 24 in accordance with FIG. 2 are passed through a series circuit of in each case two NAND elements 26-1 . . . 26-4.

Figure 3:
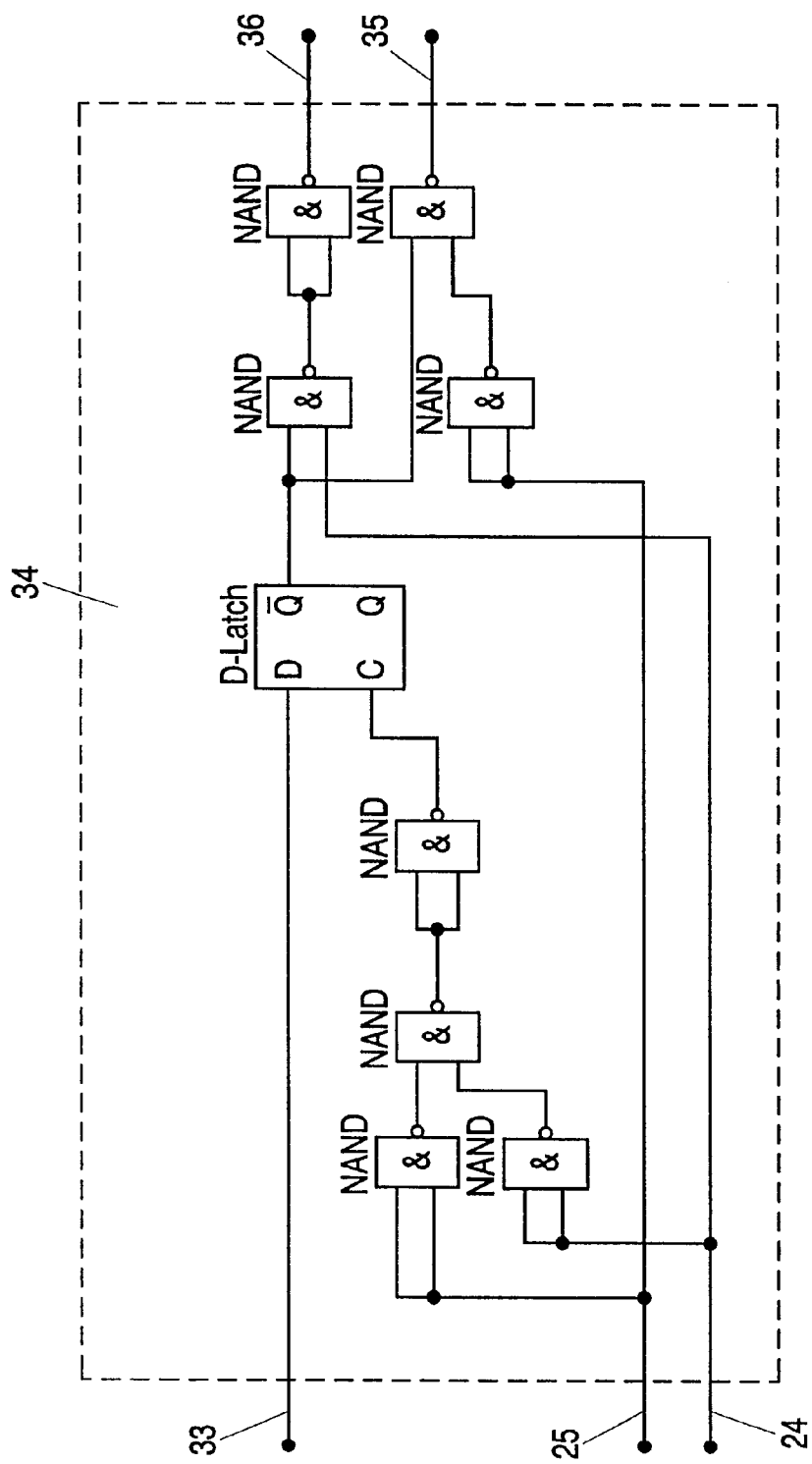
FIG. 3 a logic circuit of the control circuit in accordance with FIG. 2.

FIG. 3 shows a second embodiment of the logic circuit 34, in which the functions of the NOR element 34-1, the AND element 34-3 and the OR element 34-4 described above are in each case performed by a pure NAND element. This special embodiment of the logic circuit 34 has the advantage that then, in particular because of the series connection of NAND elements used both in the logic circuit 34 and in the time-delay circuit 26, a better matching of the respective delay times of the two circuits is possible. A resultant more precise synchronization or time coordination of the control signals with each other allows a more exact or more precisely timed driving of the switching elements S1–S4.

FIG. 4 shows the binary control signals during a switching period $1/f_s$ for the case where the full-bridge circuit 7 is operated in the half-bridge operating mode. FIGS. 4a and 4b show the fourth and third control signals on the output of the second comparator circuit 22. FIG. 4c shows the characteristic of a binary signal on the output of the NOR element 34-1 that is fed as a clock signal to the C input of the flip-flop 34-2 in the logic circuit 34.

The signals in FIGS. 4d–4g correspond to the fourth, third, first and second control signals 30, 31, 38, 39 following level adaptation on the output of the control circuit 5.

Figure 4D:
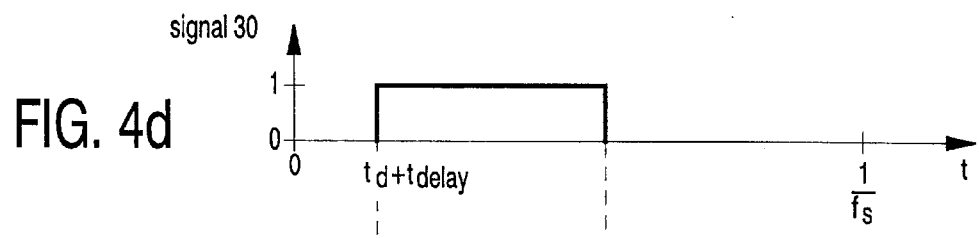

It can be seen that the signal 30 in FIG. 4d, thus the fourth control signal for driving the switching element S4, essentially corresponds to the signal 24 from FIG. 4a, but is delayed by a time delay $t_{delay}$ compared with this. The time delay would, as described above, be produced by the time-delay circuit 26. The same applies to the signal 31 shown in FIG. 4e, and thus the third control signal for driving the switching element S3, in that this is delayed by the same time delay tdelay compared with the signal 25 in FIG. 4b.

Figure 4E:
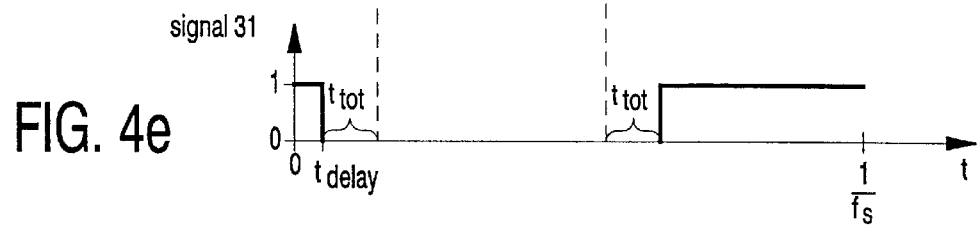
Figure 4F:
Figure 4G:
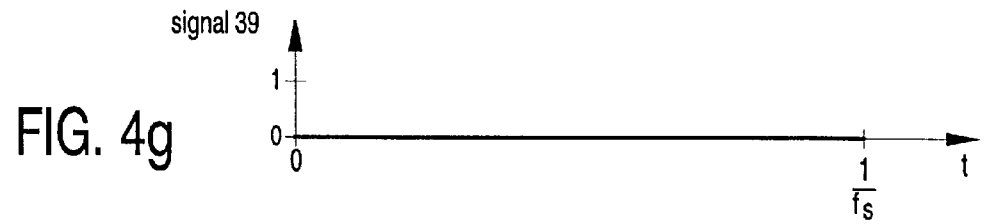
Figure 5A:
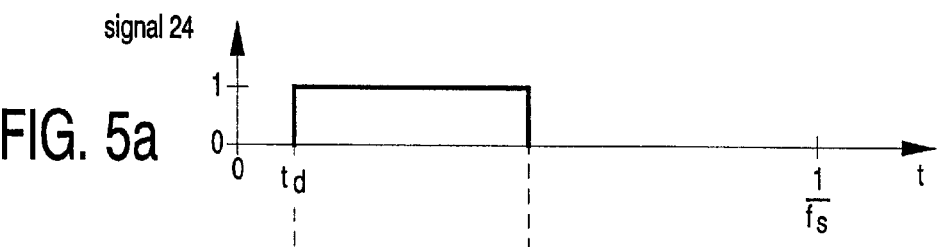
FIG. 5 signal characteristics within the control circuit in accordance with FIG. 2 during a full-bridge mode.
Figure 5B:
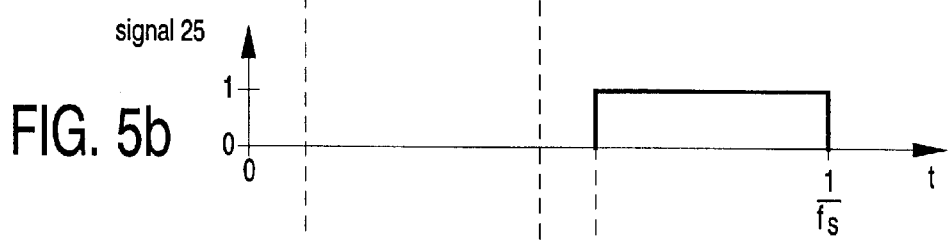
Figure 5C:
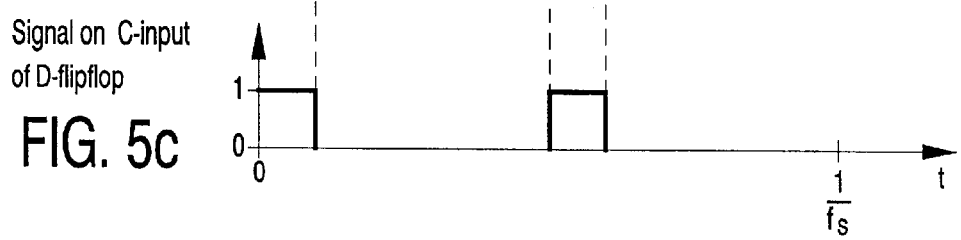
Figure 5D:
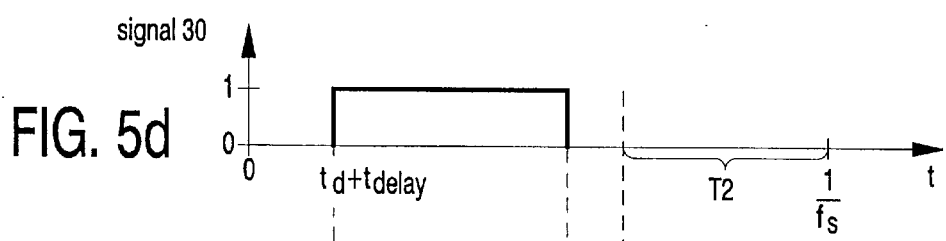
Figure 5E:
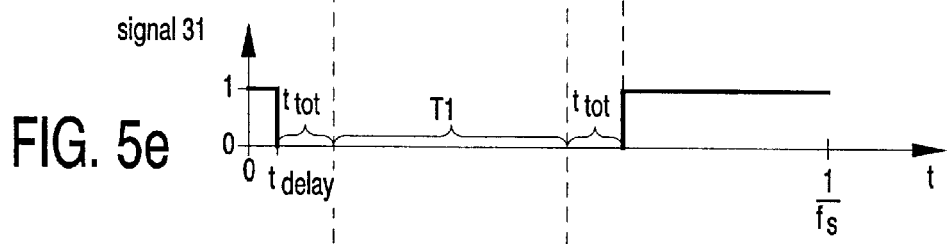
Figure 5F:
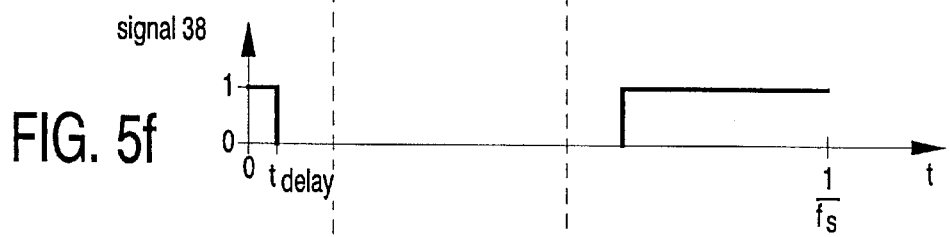
Figure 5G:
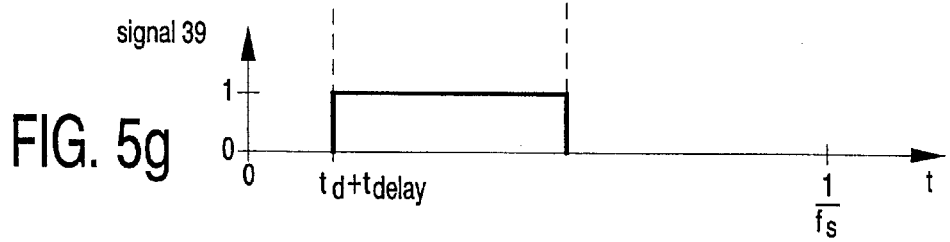

A comparison of the signal characteristics in FIGS. 4d and 4e shows that in the half-bridge mode both switching elements S3 and S4 are alternately switched on and off with an interruption, that is a dead time $t_{tot}$. During this dead time the two switching elements are switched off. Furthermore, FIGS. 4f and 4g show that the switching element S1 in the half-bridge mode is continuously switched on while at the same time the switching element S2 is continuously switched off.

FIG. 5 shows, as distinguished from FIG. 4, the characteristics of the control signals for the case that the full-bridge circuit 7 is operated in the full-bridge mode, that is at low DC input voltages. In this mode the signal characteristics shown in FIGS. 5a–5e correspond to the signals characteristics described above with reference to FIGS. 4a–4e. It follows from this in particular that the switching elements S3 and S4 leaving out of consideration the dead time are switched on and off alternately. The signal characteristics in FIGS. 5f and 5g show that in the full-bridge mode the switching elements S1 and S2 taking into consideration the dead time $t_{tot}$ are also switched on and off alternately. Put more precisely, as a comparison of FIG. 5g with 5d and 5f with 5e shows, the switching element S2 is driven in parallel with switching element S4 and switching element S1 in parallel with switching element S3.

In accordance with the invention a switching from full-bridge mode to half-bridge mode or vice-versa always takes place in the first dead time interval $t_{tot}$, once the reference signal 33 has changed. Thus the switching elements S1 . . . S4 are always switched off if the operating mode changes. In this way the loading of the switching elements as well as of the passive components of the resonance power converter 3-1 in FIG. 1 is reduced compare with the loading of the components in FIG. 7, so that these components can be embodied for lower loads.

What is claimed is:

1. A converter for conversion of a DC voltage ($U_{Bat}$) into an output direct voltage ($U_{out}$) comprising:

a full-bridge circuit that has controllable switching elements for chopping the DC voltage ($U_{Bat}$) into an AC voltage (U~) on its output;

a switching circuit for conversion of the AC voltage (U~) into the output direct voltage ($U_{out}$) of the converter; and a control circuit for generating control signals to drive the controllable switching elements according to a first converter operating mode or a second converter operating mode;

wherein a switching between the first converter operating mode and the second converter operating modes takes place according to a reference signal that represents the size of the DC voltage ($U_{Bat}$); and wherein the control circuit generates the control signals taking into account the output direct voltage ($U_{out}$) of the converter; and the control circuit carries out the switching between the first converter operating mode and the second converter operating mode only during a dead time interval $t_{tot}$, during which at least one of the controllable switching elements is switched off.

2. A converter as claimed in claim 1, wherein the full-bridge circuit has two parallel branches each with two controllable switching elements connected in series, receives the DC voltage ($U_{Bat}$) parallel to the parallel branches and outputs the AC voltage (U~) between the respective two switching elements of the two parallel branches.

3. A converter as claimed in claim 2, wherein the control circuit has a first comparator circuit for generating a reference signal as a binary signal according to the result of a comparison of the DC voltage ($U_{Bat}$) with a first and second reference voltage ($V_{ref1}$, $V_{ref2}$); and a second comparator circuit for generating a fourth control signal for driving a fourth switching element as well as for generating a third control signal for driving a third switching element in accordance with the result of a comparison of the output direct voltage ($U_{out}$) of the converter with a specified third reference voltage ($V_{ref3}$).

4. A converter as claimed in claim 3, wherein the first comparator circuit is embodied as a threshold detector.

5. A converter as claimed in claim 3, wherein the control circuit further comprises a logic circuit for generating a first control signal for driving a first switching element as well as for generating a second control signal for driving a second switching element from the third and fourth control signals in response to the binary reference signal.

6. A converter as claimed in claim 3, wherein the control circuit has a time-delay circuit for delaying the third and fourth control signals at least approximately by the time it takes for a signal to be processed by the logic circuit.

7. A converter as claimed in any of claims 3 to 6, characterized in that, the control circuit also has at least one matching circuit (29, 37) for performing the matching of the levels of the delayed first, second, third and/or fourth control signals to level requirements specified by the associated switching elements.

8. A screen for a computer or for a television, with a converter as claimed in claim 1.

9. A converter as claimed in claim 1, wherein the first converter operating mode includes a half-bridge mode and the second converter operating mode includes a full-bridge mode.

10. A converter as claimed in claim 1, wherein in one of said first converter operating mode and said second converter operating mode, at least one of said controllable switching elements is held at a single state.

11. A converter as claimed in claim 1, wherein in one of said first converter operating mode and said second converter operating mode, at least two of said controllable switching elements is held at a single state.

12. A converter as claimed in claim 1, wherein during said dead time interval $t_{tot}$ at least two of the controllable switching elements are switched off.

13. A converter as claimed in claim 1, wherein during said dead time interval $t_{out}$ at least four of the controllable switching elements are switched off.

* * * * *